J. F. GORMAN.
CLUTCH RELEASING MECHANISM.
APPLICATION FILED AUG. 8, 1919.
1,438,486.  Patented Dec. 12, 1922.
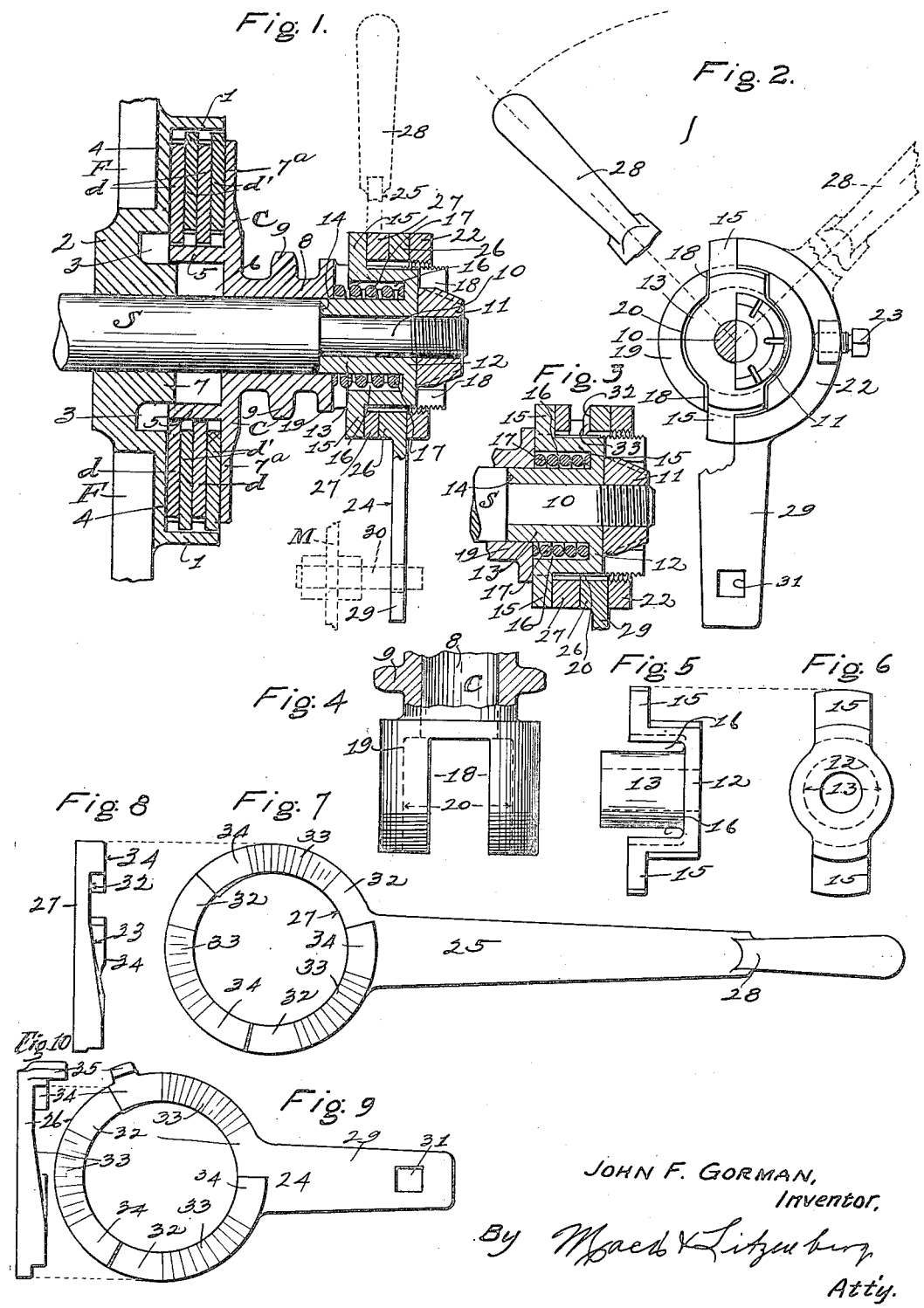
JOHN F. GORMAN,
Inventor,
By Maeck & Litzenberg,
Atty.

Patented Dec. 12, 1922.

1,438,486

UNITED STATES PATENT OFFICE.

JOHN F. GORMAN, OF PORTLAND, OREGON.

CLUTCH-RELEASING MECHANISM.

Application filed August 8, 1919. Serial No. 317,349.

*To all whom it may concern:*

Be it known that I, JOHN F. GORMAN, a citizen of the United States, and a resident of Portland, in the county of Multnomah and State of Oregon, have invented new and useful Improvements in Clutch-Releasing Mechanism, of which the following is a specification.

This invention relates to and has for its main object the provision of a simple and practical device for controlling and effecting the engagement and disengagement of the friction elements of a clutch such as is employed in connection with internal combustion engines.

My invention may be employed with equally good results in connection with clutches of the cone or disc type, and a further object of my invention is to provide means supported on, rotatable with and slidable relative to the driven element of the clutch, for effecting the release of the clutch elements, Another object is to provide in connection with a driving and a driven element, a member rotatable with the driven member and slidable relative thereto, a stationary cam member, and a relatively movable cam member coacting therewith for separating said driving and driven elements, and adjustable means for holding said members in selected positions. Other objects may appear as the description progresses.

Referring to the drawing, forming a part of this application and annexed thereto:

Fig. 1 is a longitudinal sectional elevation of my improved clutch releasing mechanism shown in connection with a common type of multiple disc clutch;

Fig. 2 is an end elevation thereof, partly broken away;

Fig. 3 is a section of a portion of the structure shown in Fig. 1, showing the clutch releasing elements open, or operated;

Fig. 4 is a fragmentary view of the driven yoke, forming a part of my invention;

Fig. 5 is a view of a rotatable limiting element against which one of the releasing cams is held;

Fig. 6 is an end view of the same;

Fig. 7 is a face view of the movable releasing cam and lever, and Fig. 8 is an end view of the same;

Fig. 9 is a face view of the stationary releasing cam, and

Fig. 10 is an end view thereof.

While my improved device may be of any suitable form, and modified to suit various designs of clutches, I have shown one practical embodiment of my invention, in which several novel combinations of elements are shown.

In Figs. 1, 2 and 3, a fly wheel F is shown carried on the drive or crank shaft S and serving as the driving element of the clutch, an annular flange 1 being formed integral with or attached to one side of the fly wheel. The hub portion 2 of the fly wheel has an annular recess 3 formed therein and the web 4 connecting the hub with the flange serves as a friction surface against which the inner disc $d$ is adapted to contact. A plurality of the disc $d$ are provided within the flanged portion of the fly wheel, as shown, and are suitably arranged for rotation with the fly wheel, while alternating with the disc $d'$ are a plurality of similar discs $d'$ suitably arranged for rotation with the hub 5 of the driven clutch element C. Said hub 5 has a central recess 6 adapted to slidably receive the projecting hub 7 of the fly wheel F and the hub proper is adapted to be slidably moved relative to the annular recess 3 in the hub 2 of the fly wheel when the clutch members are engaged and disengaged. Clutch member C has a substantially extended flange 7ª integral with the hub 5, the inner surface of which is adapted to be engaged by the outer clutch disc $d'$, and an outer hub-like member 8, integral therewith may have a sprocket or pulley 9 thereon by means of which motion may be communicated to points remote from the drive shaft.

The outer end of the drive shaft S has a reduced extension 10 thereon threaded to receive a nut 11, at the end, and on this reduced portion, I provide a member 12 having a central boss 13 adapted to be held on the shaft end 10 between the shoulder 14 and the nut 11. Arcuate extensions 15, 15, are integral with and extend outwardly and are spaced from the boss 13, so as to provide clearance 16 around the boss. A spring 17 is interposed and adapted to be compressed between the central portions of member 12 and the bottom of a recess 20 formed in a yoke member 19, integral with the driven clutch element. Thus the spring 17 serves to hold the clutch member C spaced from the member 12 and the friction plates *d* and *d"* normally in engagement.

The recess 20 in yoke 19 conforms to the inner recessed portion of member 12, and when in the positions shown, the arcuate portions 15 of member 12 project through the peripheral slots 18 of the yoke, thus causing the member 12 to rotate with said yoke. The outer end of yoke 19, is threaded to receive a nut 22, which may be adjusted to selected positions thereon and held at such positions by means of a set screw 23, or otherwise, and the adjacent sides of the nut 22 and portions 15 of member 12 are flat and substantially spaced apart, as shown, in Figs. 1 and 3.

It would seem at first glance at Fig. 1, that the threads of the nut 22 were out of contact with the exterior threads of the yoke member 18, but this is due to the fact that the section through the nut 22 is on a different plane than the plane of the side of the member 18, not in section.

Relatively stationary and movable cam members 24 and 25, as shown in Figs. 7, 8, 9 and 10, have enlarged annular portions 26 and 27, respectively, of like diameter which are adapted to be held between the nut 22 and portions 15 of member 12, with their outer sides engaging the flat sides of said nut and said member 12. Movable member 25 which serves as an operating member has a handle 28 projecting therefrom which is adapted to be manually operated for turning the member 25 about the axis of shaft S. Stationary member 24 has a depending projection 29, which is adapted to be rotatably attached to a suitable portion of the motor frame M, as indicated in broken lines in Fig. 1, a pin 30 being provided in said frame and extended through an opening 31, in the extension 29 of member 24.

The adjacent sides of the annular portions 26 and 27, of members 24 and 25, have alternately arranged flat and inclined facets 32, 32, and 33, 33, etc., so that when the handle 28 is turned in one direction, the inclined portions of said members will engage and spread the members 24 and 25 apart, the turning of member 25, being continued until the elevated flat facets 34, 34, are engaged, whereupon said members will remain in their extended positions and the clutch members thus permanently disengaged. Likewise a reverse operation of the handle will effect the opposite result. A lug 35, is provided on member 24, which is adapted to be engaged by the handle 28 for limiting the movement of member 25 relative to member 24.

As stated, member 12 is normally spaced from the rear end of the yoke 19 by means of spring 17 and the spreading of members 24 and 25 serves to compress the spring, move the clutch member C outwardly from the fly wheel F, thus separating the discs *d* and *d'* of the clutch and stopping the rotation of the driven members 12 and 19.

It should be understood that I conceive it to be possible to alter the form of device from that shown without departing from the spirit of my invention, except as I may be limited by the appended claims.

What I claim is:

1. In a clutch, in combination, driving and driven elements, one of said elements having a bifurcated extension, a member mounted on the other element and having portions extending outwardly between the parts of the bifurcated extension, a spring on said member bearing on the bifurcated element, and cam members operatively positioned around said bifurcated element and said member mounted therein and adapted to bear thereon, and means whereby the turning of said cam members relative to each other operates to move the driving and driven elements relative to each other, substantially as described.

2. In a clutch, a driving element a driven element having a bifurcated extension, a relatively concentric member rotatable therewith and having extensions projecting into the spaces between said furcations, and means for normally holding said members spaced apart, to put said driving and driven elements into driving engagement with each other.

3. A clutch mechanism comprising in combination, a drive shaft, a driving element thereon and rotatable therewith, a driven element mounted concentrically with said driving element and having a bifurcated extension, an adjustable member on the end of said extension, a limiting member carried between the furcations of said extension, and means operating between said adjustable member and said limiting member for regulating and effecting the engagement of said driving and driven element.

4. In a clutch having a driving and a driven element and a shaft for supporting said elements for operation, a yoke on said driven element, a limiting member on said shaft between the arms of said yoke, means adjustable on said driven element relative to said limiting member, and coacting means held between said adjusting and limiting means for engaging and disengaging said driven and driving elements.

Signed at Los Angeles, Los Angeles County, State of California, this 7th day of July, 1919.

JOHN F. GORMAN.

In presence of:
D. O. FAWCETT,
LUTHER L. MACK.